March 8, 1932.　　　　　A. Y. DODGE　　　　1,848,464

MOTOR VEHICLE

Filed Aug. 6, 1926　　　2 Sheets-Sheet 1

INVENTOR
ADIEL Y. DODGE
BY
M. W. McConkey
ATTORNEY

March 8, 1932.　　　　A. Y. DODGE　　　　1,848,464
MOTOR VEHICLE
Filed Aug. 6, 1926　　　　2 Sheets-Sheet 2
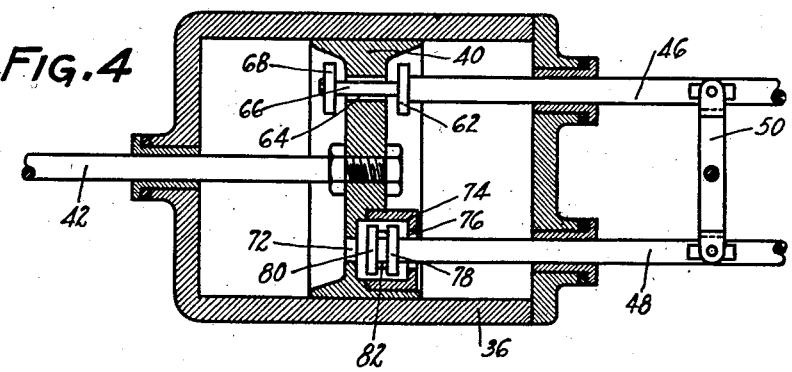
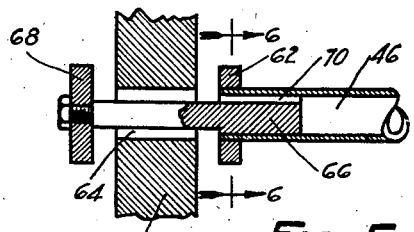
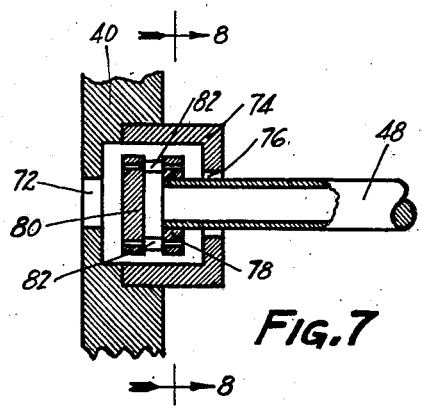
INVENTOR
ADIEL Y. DODGE
BY
ATTORNEY Patented Mar. 8, 1932

1,848,464

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

MOTOR VEHICLE

Application filed August 6, 1926. Serial No. 127,524.

This invention relates to motor vehicles and is illustrated as embodied in steering mechanism for an automobile. An object of the invention is to provide a servo or booster device, preferably operated by engine suction, controlled by a steering gear operated by the driver, in such a manner as to operate the connection for the front or other dirigible wheels. I prefer to provide a power device which is so arranged as to form a connection through which the wheels may be turned manually when the engine is not running or when the power from the engine suction is insufficient to turn the wheels quickly enough.

In one desirable arrangement the power device includes a relatively movable cylinder and piston, of which, for example, the piston may be connected to the wheel-turning connections, and which is provided with valve mechanism operated by the steering gear to place the cylinder on one side or the other of the piston in communication with the intake manifold, at the same time placing the cylinder on the other side of the piston in communication with the atmosphere. Various features of novelty relate to this valve mechanism and its use as a connecting means between the steering gear and the wheel-turning connections.

The above and other objects and features of the invention, including various novel combinations of parts and desirable particular constructions, will be apparent from the following description of one illustrative embodiment shown in the accompanying drawings, in which:

Figure 4 is a longitudinal vertical section through the power device showing the valves;

Figure 5 is a detail section showing the suction-controlling valve of Figure 4;

Figure 6 is a section through part of the valve on the line 6—6 of Figure 5;

Figure 7 is a detail view showing in section the other valve, that is, the valve which controls the air; and Figure 8 is a partial section through the valve of Figure 7 on the line 8—8 of Figure 7.

Figure 1:
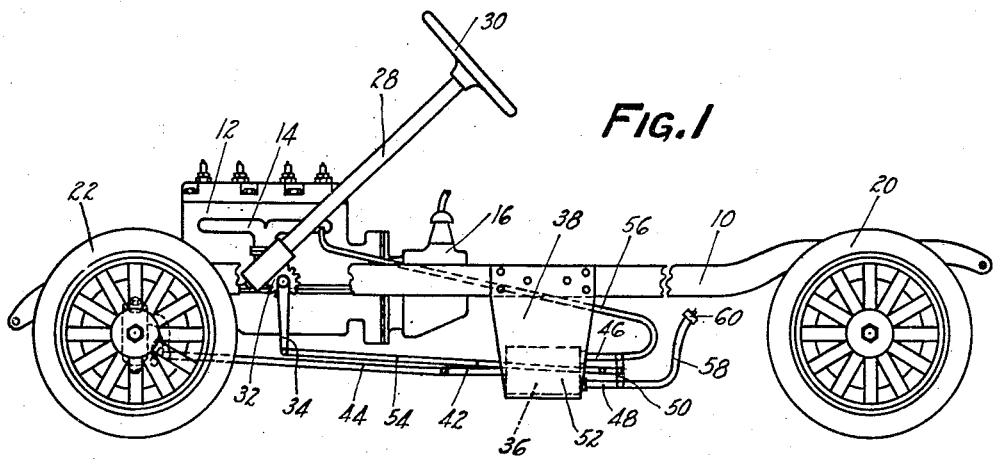
Figure 1 is a diagrammatic side elevation of an assembly chassis showing the use of a power device as a means connecting the steering gear and the wheel-turning connections.
Figure 2:
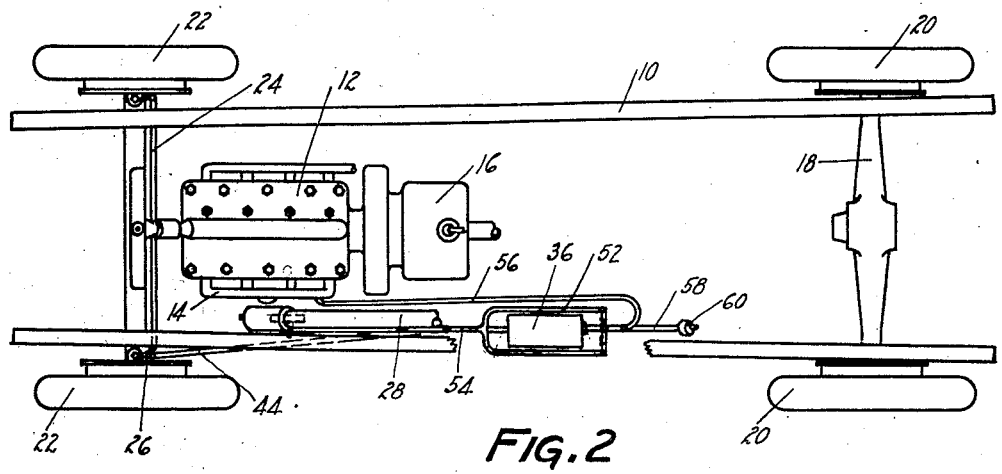
Figure 2 is a top plan view of the chassis shown in Figure 1.

The chassis shown in Figures 1 and 2 includes any suitable frame 10 supporting an internal combustion engine 12 having the usual intake manifold 14 and driving through a transmission 16 and rear axle 18 the rear road wheels 20. The chassis is supported at its front end on a pair of dirigible front wheels 22 connected in the usual manner for simultaneous swivelling movement by a cross-tie rod 24 which, with the usual steering arm 26, constitute connections controlling the turning of the dirigible wheels. The turning of the wheels is intended to be controlled by a steering gear 28 operated by the usual steering wheel 30 which is arranged to actuate suitable gearing 32 to rock and operate lever 34. The present invention relates to the means through which the wheels 22 are turned on operation of the lever 34 or its equivalent by power derived through the intake manifold 14 from suction of the engine 12.

In the particular embodiment illustrated, there is a stationary cylinder 36 supported on a suitable bracket 38 carried by frame 10 and within which is a piston 40 having a connecting rod 42 projecting through one end of the cylinder and operating the steering arm 26 by means of a connecting link 44 or the like. The piston 40 is operated by a pair of hollow piston rods 46 and 48 operated by an equalizer bar 50 connected to the piston rods at its opposite ends and pivotally connected at its center to a yoke 52 forming the end of a connecting link 54 from the lever 34 at the bottom of the steering gear.

The hollow piston rod 46 is continued by means of a suitable flexible hose connection 56 to the intake manifold 14. The hollow piston rod 48 is continued by means of a suitable flexible hose connection 58 supported in a suitably protected position 60 at its end and opening to the atmosphere.

The inner end of the piston rod 46 is provided with a flange 62 arranged to be operated by thrust from the steering gear to close a passage 64 through the piston 40. A projecting rod 66 passing through the opening 64 carries a cooperating flange 68 arranged to be operated by tension from the steering gear to close the passage 64. Suitable conduits or passages 70 are formed around the end of member 66, as shown in Figure 6. It will be seen that thrust on the piston rod 46 from the steering gear will block the right-hand end of the passage 64 by moving the flange 62 against the piston and that the interior of the hollow piston rod 46 (and therefore the intake manifold 14) is in communication through the passages 70 and 64 with the left-hand end of the cylinder 36. On the other hand, when there is tension on the piston rod 46 from the steering gear the left-hand end of the passage 64 is closed by flange 68 while the intake manifold 14 is in communication through the passage 70 with the right-hand end of cylinder 36.

Opposite the hollow piston rod 48 which constitutes the air connection, piston 40 is formed with an opening or passage 72 and with a bushing 74 provided with an opening 76 opposite the opening 72 and surrounding the hollow piston rod 48. In the space defined by the bushing 74 and piston 40 between the openings 72 and 76, there is arranged a valve including a flange 78 on the end of the hollow piston rod 48 to be moved by tension from the steering gear to close the passage 76, together with a flange 80 spaced from the flange 78 by posts 82 and arranged to be operated by thrust on the piston rod 48 from the steering gear to close the passage 72. Thus thrust on piston rod 48 will place the right-hand end of the cylinder in communication with the atmosphere at the same time that thrust on the piston rod 46 places the left hand end of the cylinder in communication with the intake manifold 14. Conversely, tension from the steering gear will place the left-hand end of the cylinder in communication with the atmosphere and the right-hand end of the cylinder in communication with the intake manifold.

It will be seen from the above description that operating the steering gear moves the valves to cause the engine suction to operate on piston 40 in a direction to turn the wheels 22, and when the wheels reach a position corresponding to the position of the steering gear the valves will automatically balance and will not further operate the wheels. It will also be seen that if the engine is not running or if the power from engine suction is insufficient, the steering gear will operate to turn the wheels manually by reason of the connection of rods 46 and 48 to the piston rod 42 (and therefore to the wheels) through the two valves.

Figure 3:
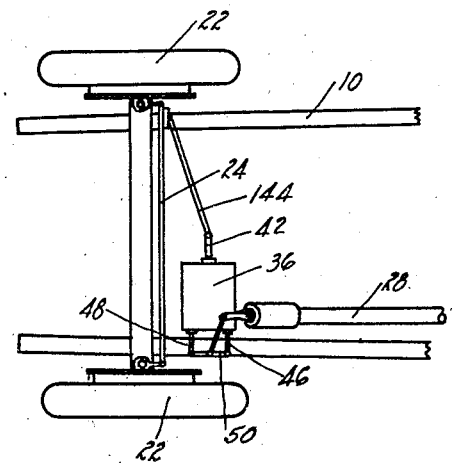
Figure 3 is a bottom plan view of the front end of a different chassis showing the arrangement of the parts when cross-steering is used.

In Figure 3 is shown an arrangement which may be used in cross steering and which differs from that described above only in that the parts are arranged transversely of the chassis so that the power device 36 is crosswise with respect to frame 10 and the link 144 connecting the piston rod 42 to the wheels is connected to the right-hand wheel instead of to the left-hand wheel.

While particular constructions have been described in considerable detail, it is not my intention to limit the scope of the invention to those particular constructions or otherwise than by the terms of the appended claims.

I claim:

1. A motor vehicle comprising, in combination, dirigible wheels and a vehicle-driving internal combustion engine having an intake manifold, a steering gear and connections controlled thereby for controlling the movement of the dirigible wheels, a relatively movable cylinder and piston arranged to operate said connections, and valve mechanism operated by the steering gear and arranged to place the cylinder on one side or the other of the piston in communication with the intake manifold to cause movement of the wheels by power derived from the engine suction, said valve mechanism forming means connecting the steering gear to said connections and through which the wheels may be turned by manual power when the power of said suction is insufficient or when the engine is not running.

2. A motor vehicle comprising, in combination, dirigible wheels, a vehicle-driving internal combustion engine having an intake manifold, a steering gear and connections controlled thereby for turning the dirigible wheels, and means connecting the steering gear and said connections and including the following parts: a stationary cylinder; a piston in the cylinder connected to said connections and extending through one end of the cylinder; and a pair of devices connected to the piston and extending through the other side of the cylinder and connected to the steering gear, one of said devices having a valve operated by thrust from the steering gear to place the cylinder on one side of the piston in communication with said intake manifold and operated by tension from the steering gear to place the cylinder on the other side of the piston in communication with the intake manifold, and the other device having a valve operated by thrust and tension from the steering gear to place in communication with the atmosphere that end of the cylinder which is not in communication with the intake manifold.

3. A motor vehicle comprising, in combination, dirigible road wheels, a connection between the wheels causing them to swivel together, a steering gear, a cylinder and piston arranged to swivel the wheels by fluid power, and connections from said gear to the wheels including the piston and valve mechanism operated by the gear and through which the wheels may also be swivelled by direct manual power from the gear.

In testimony whereof, I have hereunto signed my name.

ADIEL Y. DODGE.